United States Patent
Kwon et al.

(10) Patent No.: US 12,260,533 B2
(45) Date of Patent: Mar. 25, 2025

(54) METHOD AND APPARATUS WITH CONTRAST ADJUSTMENT

(71) Applicant: Samsung Electronics Co., Ltd., Suwon-si (KR)

(72) Inventors: Kinam Kwon, Suwon-si (KR); Junsang Yu, Seoul (KR); Sangwon Lee, Seongnam-si (KR); Nahyup Kang, Seoul (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 17/680,934

(22) Filed: Feb. 25, 2022

(65) Prior Publication Data
US 2023/0081302 A1 Mar. 16, 2023

(30) Foreign Application Priority Data
Sep. 13, 2021 (KR) .................. 10-2021-0121837

(51) Int. Cl.
*G06T 5/00* (2024.01)
*G06T 5/92* (2024.01)

(52) U.S. Cl.
CPC .................. *G06T 5/92* (2024.01); *G06T 5/00* (2013.01); *G06T 2207/20004* (2013.01)

(58) Field of Classification Search
CPC ... G06T 5/92; G06T 5/00; G06T 2207/20004; G06T 5/73; G06T 2207/20012; G06T 5/20; G06T 7/11; G06T 7/13; H04N 5/57
See application file for complete search history.

(56) References Cited

U.S. PATENT DOCUMENTS

| | | | |
|---|---|---|---|
| 10,019,810 B2 * | 7/2018 | Arnison | G06T 7/571 |
| 2005/0025379 A1 | 2/2005 | Keshet et al. | |
| 2005/0114418 A1 | 5/2005 | Rosenstengel | |
| 2008/0266413 A1 | 10/2008 | Cohen et al. | |
| 2009/0077359 A1 | 3/2009 | Chakravarthula et al. | |
| 2011/0229029 A1 | 9/2011 | Kass | |

(Continued)

FOREIGN PATENT DOCUMENTS

| | | |
|---|---|---|
| JP | 2006-121713 A | 5/2006 |
| JP | 3870796 B2 | 1/2007 |

(Continued)

OTHER PUBLICATIONS

Y. Zhou, D. Ren, N. Emerton, S. Lim and T. Large, "Image Restoration for Under-Display Camera," 2021 IEEE/CVF Conference on Computer Vision and Pattern Recognition (CVPR), Nashville, TN, USA, Jun. 20-25, 2021, pp. 9175-9184, doi: 10.1109/CVPR46437.2021.00906. (Year: 2021).*

(Continued)

*Primary Examiner* — Aaron W Carter
(74) *Attorney, Agent, or Firm* — NSIP Law

(57) ABSTRACT

A method with image processing includes: setting an offset window for an offset pattern of a kernel offset and an offset parameter for an application intensity of the kernel offset; determining an output kernel by applying the kernel offset to an input kernel based on the offset window and the offset parameter; and adjusting contrast of a degraded image using the output kernel.

23 Claims, 10 Drawing Sheets

(56) References Cited

U.S. PATENT DOCUMENTS

| | | | | |
|---|---|---|---|---|
| 2015/0110403 | A1* | 4/2015 | Cho | G06F 18/23 |
| | | | | 382/195 |
| 2015/0228061 | A1* | 8/2015 | Shin | G06T 5/00 |
| | | | | 382/167 |
| 2016/0156858 | A1* | 6/2016 | Lee | G06T 5/20 |
| | | | | 348/241 |
| 2017/0236258 | A1* | 8/2017 | Hsu | G06T 7/13 |
| | | | | 382/260 |
| 2017/0237961 | A1* | 8/2017 | Barron | H04N 1/6086 |
| | | | | 348/223.1 |
| 2018/0276803 | A1* | 9/2018 | Lee | H04N 5/33 |
| 2018/0315171 | A1* | 11/2018 | Lee | H04N 25/63 |
| 2019/0391380 | A1 | 12/2019 | Deissler et al. | |
| 2020/0051215 | A1* | 2/2020 | Smirnov | G06T 5/20 |
| 2020/0051256 | A1* | 2/2020 | Wang | G06T 7/20 |
| 2020/0349684 | A1* | 11/2020 | Jung | G06T 5/50 |
| 2021/0090228 | A1* | 3/2021 | Jiang | G06T 5/70 |
| 2023/0071693 | A1* | 3/2023 | Kang | G06T 5/70 |
| 2023/0162473 | A1* | 5/2023 | Kobayashi | G06T 5/73 |
| 2024/0020808 | A1* | 1/2024 | Yoo | G06T 5/20 |

FOREIGN PATENT DOCUMENTS

| | | |
|---|---|---|
| JP | 2013-127759 A | 6/2013 |
| KR | 10-2010-0016278 A | 2/2010 |
| KR | 10-2020-0127439 A | 11/2020 |

OTHER PUBLICATIONS

Delbracio, Mauricio, et al. "The non-parametric sub-pixel local point spread function estimation is a well posed problem." *International journal of computer vision* vol. 96 Issue Feb. 2, 28, 2011 (19 pages in English).

Zhang, Hai-Miao, and Bin Dong. "A Review on Deep Learning in Medical Image Reconstruction." *Journal of the Operations Research Society of China* vol. 8 Issue 2 arXiv:1906.10643v1 Jun. 23, 2019 (31 pages in English).

Wen, Fei, et al. "A Simple Local Minimal Intensity Prior and An Improved Algorithm for Blind Image Deblurring." *IEEE Transactions on Circuits and Systems for Video Technology* vol. 31 Issue 8 arXiv:1906.06642v5 Oct. 29, 2020 (14 pages in English).

Zhou, Yuqian, et al. "Image Restoration for Under-Display Camera." *Proceedings of the IEEE/CVF Conference on Computer Vision and Pattern Recognition* 2021 (10 pages in English).

Qian, Qinchun, et al. "Space-Varying Blur Kernel Estimation and Image Deblurring." Digital Photography X. vol. 9023. SPIE, 2014, (11 pages in English).

Extended European search report issued on Jun. 5, 2023, in counterpart European Patent Application No. 22189853.9 (9 pages in English).

Korean Office Action issued on Aug. 12, 2024, in counterpart Korean Patent Application No. 10-2021-0121837 (2 pages in English, 5 pages in Korean).

* cited by examiner

METHOD AND APPARATUS WITH CONTRAST ADJUSTMENT

CROSS-REFERENCE TO RELATED APPLICATIONS

This application claims the benefit under 35 USC § 119(a) of Korean Patent Application No. 10-2021-0121837, filed on Sep. 13, 2021 in the Korean Intellectual Property Office, the entire disclosure of which is incorporated herein by reference for all purposes.

BACKGROUND

1. Field

The following description relates to a method and apparatus with contrast adjustment.

2. Description of Related Art

In the process of acquiring an image, the quality of the image may be degraded. Image restoration may restore an original image by removing a degraded element from a degraded image. The degradation between the original image and the degraded image may be modeled through a degradation kernel, and image restoration may restore the degraded image to the original image using the degradation kernel. Image restoration may include a method of using prior information and a method of learning a relationship between an original image and a degraded image. In image restoration, the performance of a kernel may directly affect the restoration performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with image processing includes: setting an offset window for an offset pattern of a kernel offset and an offset parameter for an application intensity of the kernel offset; determining an output kernel by applying the kernel offset to an input kernel based on the offset window and the offset parameter; and adjusting contrast of a degraded image using the output kernel.

The setting of the offset window and the offset parameter may include: setting a distribution type of offset values in the offset window; and setting a distribution parameter specifying a detailed distribution of the distribution type.

The distribution type may include a Gaussian distribution, and the distribution parameter may include a standard deviation of the Gaussian distribution.

The setting of the offset window and the offset parameter may include: setting a contrast adjustment parameter for a contrast adjustment degree; and setting the offset parameter by normalizing the contrast adjustment parameter based on the offset values of the offset window.

The step of setting the contrast adjustment parameter may include setting the contrast adjustment parameter based on an image characteristic of the degraded image.

A size of the offset window may correspond to a size of the input kernel, and an intensity of the contrast adjustment parameter may be adjusted based on the size of the offset window according to the normalizing.

The method may include adjusting a size of the input kernel.

The setting of the offset window and the offset parameter may include setting a size of the offset window and the offset parameter based on the adjusted size of the input kernel.

The method may include detecting a first area and a second area having different image characteristics in the degraded image, and the setting of the offset window and the offset parameter may include individually setting the offset window and the offset parameter for each of the first area and the second area.

The first area and the second area may respectively correspond to a flat area and an edge area, and the setting of the offset window and the offset parameter may include: setting a size of a first offset window for the first area to be larger than that of a second offset window for the second area; and setting an intensity of the first offset parameter for the first area to be weaker than that of the second offset parameter for the second area.

The determining of the output kernel may include: determining a new input kernel by applying the kernel offset to the input kernel; and determining the output kernel by normalizing the new input kernel based on kernel values of the new input kernel.

In another general aspect, one or more embodiments include a non-transitory computer-readable storage medium storing instructions that, when executed by a processor, configure the processor to perform any one, any combination, or all operations and methods described herein.

In another general aspect, an apparatus with image processing includes: a processor configured to: set an offset window for an offset pattern of a kernel offset and an offset parameter for an application intensity of the kernel offset, determine an output kernel by applying the kernel offset to an input kernel based on the offset window and the offset parameter, and adjust contrast of a degraded image using the output kernel.

For the setting of the offset window and the offset parameter, the processor may be configured to: set a distribution type of offset values in the offset window, and set a distribution parameter specifying a detailed distribution of the distribution type.

For the setting of the offset window and the offset parameter, the processor may be configured to: set a contrast adjustment parameter for a contrast adjustment degree, and set the offset parameter by normalizing the contrast adjustment parameter based on the offset values of the offset window.

The processor may be configured to detect a first area and a second area having different image characteristics in the degraded image, and for the setting of the offset window and the offset parameter, individually set the offset window and the offset parameter for each of the first area and the second area.

The first area and the second area may respectively correspond to a flat area and an edge area, and for the setting of the offset window and the offset parameter, the processor may be configured to: set a size of a first offset window for the first area to be larger than that of a second offset window for the second area, and set an intensity of the first offset parameter for the first area to be weaker than that of the second offset parameter for the second area.

For the determining of the output kernel, the processor may be configured to: determine a new input kernel by applying the kernel offset to the input kernel, and determine the output kernel by normalizing the new input kernel based on kernel values of the new input kernel.

The apparatus may include a memory storing instructions that, when executed by the processor, configure the processor to perform the setting of the offset window and the offset parameter, the determining of the output kernel, and the adjusting of the contrast.

In another general aspect, an electronic device includes: a processor configured to: set a distribution type of offset values in an offset window, and a distribution parameter specifying a detailed distribution of the distribution type, set the offset window based on the distribution type and the distribution parameter, set a contrast adjustment parameter for a contrast adjustment degree, set an offset parameter by normalizing the contrast adjustment parameter based on the offset values of the offset window, determine an output kernel by applying the kernel offset to an input kernel based on the offset window and the offset parameter, and adjust contrast of a degraded image using the output kernel.

The processor may be configured to: determine a new input kernel by applying the kernel offset to the input kernel, and determine the output kernel by normalizing the new input kernel based on kernel values of the new input kernel.

In another general aspect, an electronic device includes: one or more sensors configured to obtain an input image; and one or more processors configured to: determine a kernel offset based on a distribution parameter and a contrast adjustment parameter; determine an output kernel by applying the kernel offset to an input kernel; and determine an output image by applying the output kernel to the input image.

For the determining of the kernel offset, the one or more processors may be configured to: determine an offset window based on the distribution parameter; determine an offset parameter based on the contrast adjustment parameter; and determine the kernel offset based on the offset window and the offset parameter.

Kernel values of the offset window may increase towards a central portion of the offset window and decrease towards an outer portion of the offset window.

The one or more sensors may include an under-display camera (UDC), and for the obtaining of the input image, the UDC may be configured to obtain a degraded image.

Other features and aspects will be apparent from the following detailed description, the drawings, and the claims.

Figure 1:
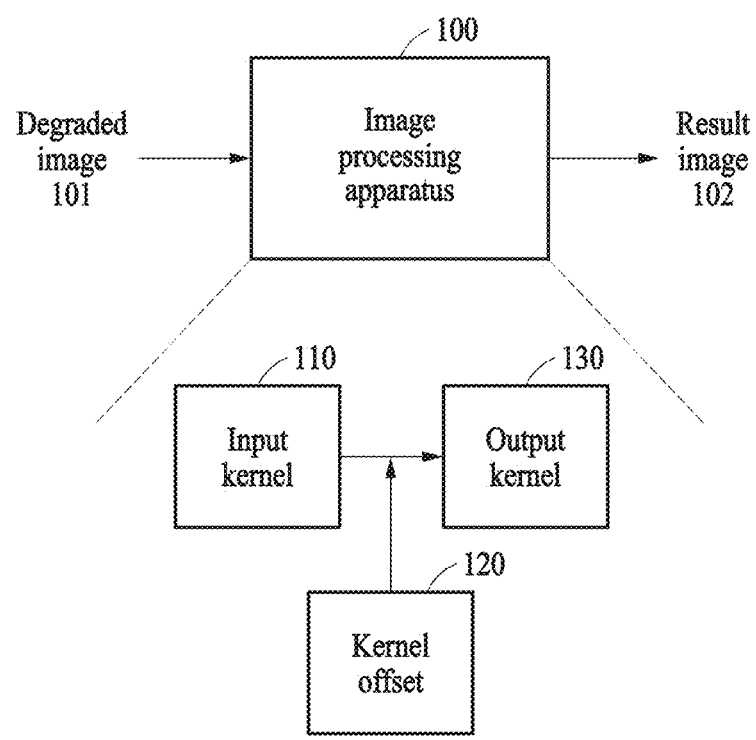
FIG. 1 illustrates an example of an operation of an image processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, each of expressions, for example, "between" and "immediately between" and "adjacent to" and "immediately adjacent to," should also be respectively construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of an operation of an image processing apparatus. Referring to FIG. 1, an image processing apparatus 100 may output a result image 102 by performing image restoration and/or image enhancement on a degraded image 101. In the process of generating the degraded image 101, various degraded elements may be accompanied by the degraded image 101. For example, the degraded image 101 may be generated through an under-display camera (UDC), and may accompany degraded elements such as a reduced sharpness, a haze effect, a reduced contrast, a ghost effect, and/or increased noise. Degradation may be modeled as in Equation 1 below, for example.

$$y = A * x + n \qquad \text{Equation 1}$$

In Equation 1, y denotes measured data, A denotes a degradation kernel, x denotes a ground truth (GT) image, n denotes noise, and * denotes a convolution operation. The degraded image 101 may correspond to the measured data, and the result image 102 may correspond to the GT image. The GT image may also be referred to as an original image, and the degradation kernel may also be simply referred to as a kernel, a filter, or a point spread function (PSF). The convolution operation may be replaced by other operations.

The image processing apparatus 100 may restore the degraded image 101 to the result image 102 using a provided kernel. For example, the image processing apparatus 100 may perform image restoration through a method of using prior information and/or a method of learning a relationship between the measured image and the GT image. In both methods, the performance of a kernel may directly affect the restoration performance.

Unpredictable noise, manufacturing tolerance, and intervention of an image signal processing (ISP) pipeline may hinder a kernel for perfect degradation modeling from being derived by a typical image processing apparatus. For example, even when the typical image processing apparatus derives an input kernel 110 is through optical modeling using a design of a UDC, the input kernel 110 may lack a contrast restoration capability due to incomplete modeling. Also, the typical image processing apparatus may require supplementation of a contrast function due to insufficient prior information or errors in the prior information.

In contrast, when the input kernel 110 is provided, the image processing apparatus 100 of one or more embodiments may generate an output kernel 130 by applying a kernel offset 120 to the input kernel 110. The output kernel 130 may have an improved contrast adjustment function over the input kernel 110 used by the typical image processing apparatus. The image processing apparatus 100 of one or more embodiments may perform image restoration using the output kernel 130, and thus, a result image 102 having enhanced contrast may be derived in the result image 102 compared to when the input kernel 110 is used by the typical image processing apparatus (e.g., without using the kernel offset 120 and/or the output kernel 130). When the input kernel 110 is an existing kernel having a predetermined function, the contrast adjustment function may be supplemented to the input kernel 110 through the kernel offset 120. When the input kernel 110 is a new kernel having no function, a contrast enhancement function may be added to the input kernel 110 through the kernel offset 120.

The image processing apparatus 100 of one or more embodiments may enhance the contrast of the result image 102 by adjusting at least one of a kernel size, an offset pattern, and an application intensity of an offset. When the kernel size and the offset pattern are determined, the image processing apparatus 100 may finely adjust the contrast through tuning parameters (e.g., a distribution parameter and a contrast adjustment parameter).

The kernel offset 120 may be defined by an offset window related to the offset pattern and an offset parameter related to the application intensity of the offset. The kernel offset 120 may be applied to the input kernel 110 to generate the output kernel 130 through a summation of kernel values of the input kernel 110 and offset values of the offset window (e.g., an elementwise addition of pixels), where the offset pattern may indicate a distribution of such offset values. For example, the offset values may follow a Gaussian distribution. In this case, in response to the application of the kernel offset 120 to the input kernel 110, the kernel values at a central portion of the input kernel 110 may increase much more than the kernel values at an outer portion of the input kernel 110. The image processing apparatus 100 may apply, to the kernel offset 120, an offset pattern appropriate or predetermined for the degradation in the degraded image 101. Different offset patterns may be applied according to the degradation. The offset parameter may determine the application intensity of the offset. As the value of the offset parameter increases, the kernel values may increase much more.

The kernel size may affect not only an amount of computation for image restoration but also a restoration result. The image processing apparatus 100 may appropriately adjust the kernel size in consideration of the amount of computation and/or the result. Since the restoration result may also be affected by the offset parameter, the image processing apparatus 100 may eliminate the effect of the kernel size on the offset parameter by normalizing the offset parameter based on the kernel size. Accordingly, the kernel size and the offset application intensity may be individually operated.

Figure 2:
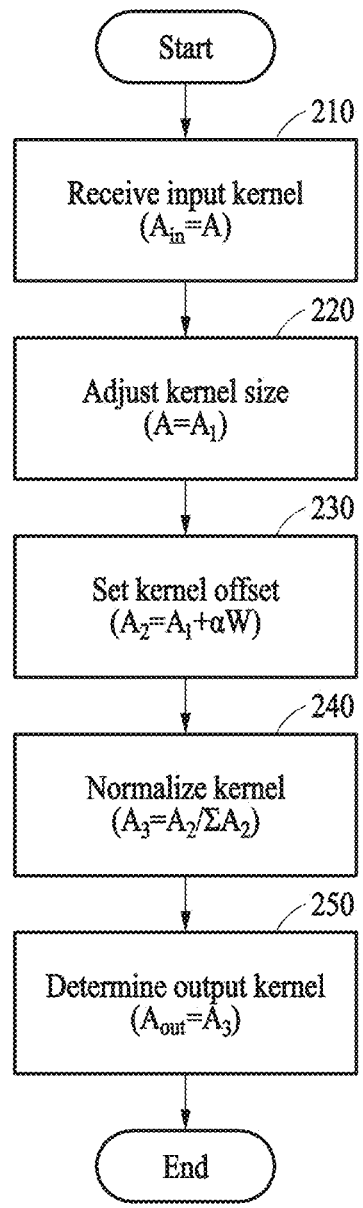
FIG. 2 is a flowchart illustrating an example of a kernel modification operation using a kernel offset.

FIG. 2 is a flowchart illustrating an example of a kernel modification operation using a kernel offset. Operations 210 to 250 of FIG. 2 may be performed sequentially or non-sequentially. For example, the order of operations 210 to 250 may be changed, and/or at least two of operations 210 to 250 may be performed in parallel.

Referring to FIG. 2, in operation 210, an image processing apparatus may receive an input kernel. The input kernel may be expressed as $A_{in} = A$. The input kernel may be an existing kernel or a new kernel. When the input kernel is a new kernel, the input kernel may be an identity kernel in which only a kernel value at the center is "1" and the other kernel values are "0".

In operation 220, the image processing apparatus may adjust a kernel size (e.g., a height and/or width of channels of the kernel). The input kernel with the size adjusted may be expressed as $A_1$. The kernel size may be reduced through cropping and increased through zero padding. When the kernel size is reduced, the computational burden may decrease, but information at an outer portion of the kernel may be lost. In contrast, when the kernel size is increased, information may not be lost, but the computational burden may increase. Further, depending on the kernel size, artifacts may occur in a restoration result image. The image processing apparatus may thus adjust the kernel size in consideration of computational burden and/or degradation characteristics. In some cases, operation 220 may be omitted.

In operation 230, the image processing apparatus may set a kernel offset. The kernel offset may be expressed as $\alpha W$. Applying the kernel offset to the input kernel may be expressed as $A_1 + \alpha W$, and an application result may be expressed as $A_2$.

W may denote an offset window. The offset window may have a size and dimensions corresponding to the input kernel. In other words, kernel values of the input kernel and offset values of the offset window may have the same dimension and be provided in the same number. When the size of the input kernel is adjusted, the size of the offset window may be set based on and/or corresponding to the adjusted size of the input kernel. The offset window may determine an offset pattern of the kernel offset. The offset pattern may indicate a distribution of offset values applied to the input kernel. By adding the kernel values of the input kernel and the offset values of the offset window elementwise, the offset kernel may be applied to the input kernel.

$\alpha$ denotes an offset parameter and may determine an application intensity of the offset values of the offset window. The offset values of the offset window may be scaled through the offset parameter. As the value of the offset parameter increases, the offset values may be scaled much larger and applied to the input kernel.

In operation 240, the image processing apparatus may normalize the kernel. When the kernel offset is applied to the input kernel, a kernel intensity may be different than that before the kernel offset is applied. The change in the kernel intensity may cause an incidental effect in addition to an improved effect intended through the kernel. Thus, the image processing apparatus may bring the kernel intensity after the kernel offset is applied back to that before the kernel offset is applied through kernel normalization. When the input kernel after the kernel offset is applied is denoted as $A_2$, the image processing apparatus may normalize $A_2$ based on kernel values of $A_2$. For example, $A_2$ may be normalized by dividing $A_2$ by the sum of the kernel values of $A_2$ ($\Sigma A_2$). A normalization result may be expressed as $A_3$.

In operation 250, the image processing apparatus may determine an output kernel. The image processing apparatus may determine the normalization result $A_3$ to be the output kernel. The output kernel may be expressed as $A_{out}$. The image processing apparatus may perform image restoration using the output kernel.

Figure 3:
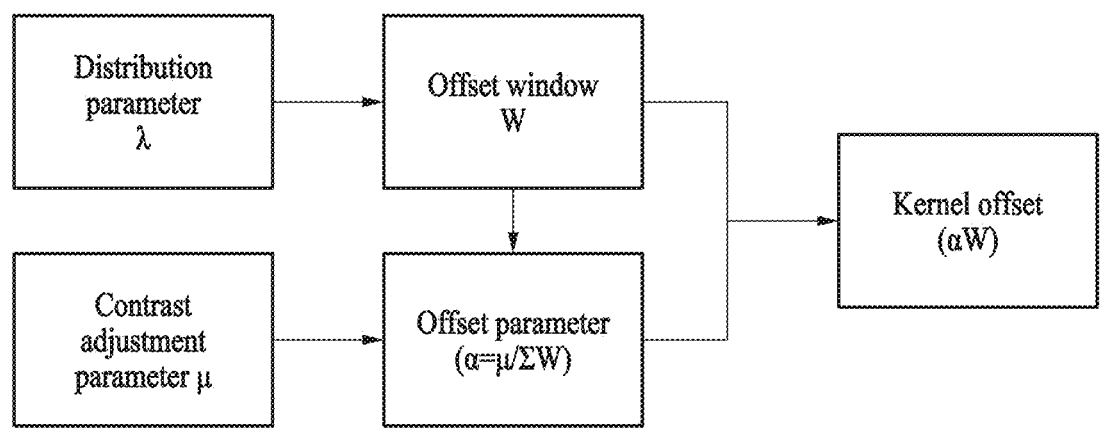
FIG. 3 illustrates an example of a kernel offset setting operation.

FIG. 3 illustrates an example of a kernel offset setting operation. Referring to FIG. 3, an image processing apparatus may determine an offset window based on a distribution parameter. The distribution parameter may be expressed as $\lambda$, and the offset window may be expressed as W. The offset window may include offset values of a predetermined distribution. The distribution of the offset values may be referred to as an offset pattern. Various types of distributions may be used according to the characteristics of the degradation and/or a contrast adjustment direction. The image processing apparatus may selectively use an offset pattern appropriate or determined for the characteristics of the degradation in the degraded image and/or for the contrast adjustment direction according to the characteristics of the degradation.

For example, the offset pattern may include a probability distribution such as a Gaussian distribution, a perturbation distribution to which deep learning-related modeling is applied, and/or an optical distribution reflecting optical characteristics of an optical device such as a UDC. The probability distribution and the perturbation distribution may mitigate possible artifacts caused by contrast enhancement. The probability distribution and the perturbation distribution may be used in a common situation (e.g., to enhance contrast of a typical camera). For example, the probability distribution may mitigate blocking artifacts or shading, and the perturbation distribution may mitigate overfitting in a deep learning-based restoration method. More specifically, when a kernel offset following a Gaussian distribution is used, the kernel values at a central portion of the input kernel may increase much larger than the kernel values at an outer portion of the input kernel (e.g., the kernel values may increase towards the central portion and the kernel values may decrease towards the outer portion). Accordingly, the block artifacts may be mitigated. The optical distribution may mitigate a degradation in an UDC image. The optical distribution may be used in a special situation (e.g., to enhance contrast of a special camera, such as a UDC).

When a distribution type of the offset values is determined, a detailed distribution of the distribution type may be specified or determined through the distribution parameter. Each distribution type may define a parameter for specifying a detailed distribution, and the parameter may be set through the distribution parameter. For example, a distribution parameter for a Gaussian distribution may include a standard deviation. When the offset values are distributed in two dimensions in the offset window, the distribution parameter may include a first standard deviation of the distribution along a first axis of the two dimensions and a second standard deviation of the distribution along a second axis of the two dimensions.

The image processing apparatus may determine the offset parameter based on a contrast adjustment parameter. The contrast adjustment parameter may be expressed as p, and the offset parameter may be expressed as $\alpha$. The contrast adjustment parameter may determine a contrast adjustment degree. For example, when the value of the contrast adjustment parameter increases, the kernel offset may increase and/or be applied more strongly. The image processing apparatus may set the contrast adjustment parameter based on image characteristics of the degraded image. For example, a small value of contrast adjustment parameter may be applied to a flat characteristic for a weak offset, and a large value of contrast adjustment parameter may be applied to an edge characteristic or a texture characteristic for a strong offset.

The contrast adjustment parameter may be normalized based on offset values of the offset window. For example, the contrast adjustment parameter may be normalized by dividing the contrast adjustment parameter by the sum of the offset values of the offset window ($\Sigma W$). The offset parameter may correspond to a normalization result. Accordingly, the effect of the kernel size on the offset parameter may be eliminated through normalization. When the size of the input kernel is adjusted, the size of the offset window may be set based on the adjusted size of the input kernel, and offset values according to the window size may be reflected in the offset parameter. The size of the offset window may correspond to the kernel size, and an intensity of the contrast adjustment parameter may be determined based on, or adjusted to be appropriate for, the size of the offset window according to normalization.

The image processing apparatus may set the kernel offset based on the offset window and the offset parameter. For example, the image processing apparatus may set a result of multiplication of the offset window and the offset parameter as the kernel offset. The offset parameter may scale the offset values of the offset window through multiplication.

Figure 4:
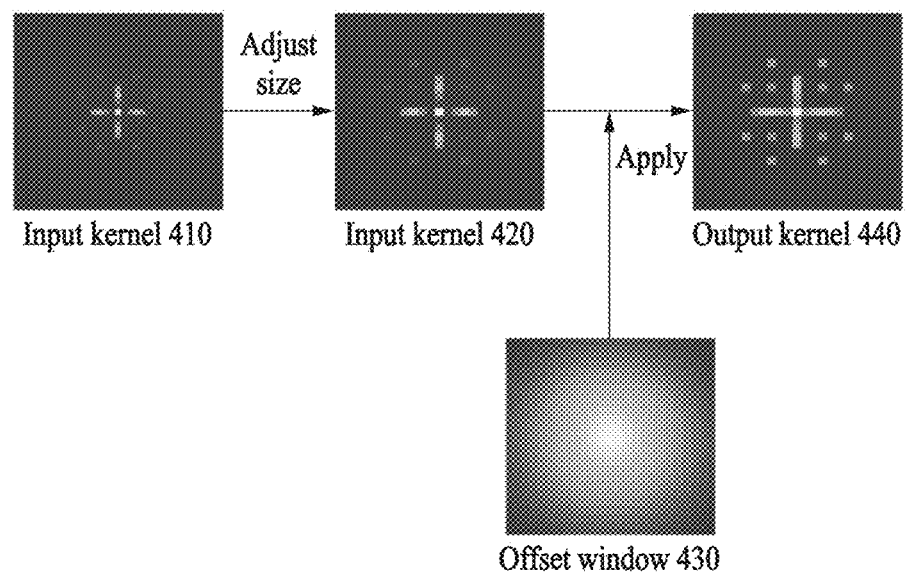
FIG. 4 illustrates an example of a process of changing a kernel.

FIG. 4 illustrates an example of a process of changing a kernel. Referring to FIG. 4, an input kernel 410 (e.g., $A_{in}$ or A in FIG. 2) is received. The input kernel 410 may be an existing kernel designed to improve an image quality of a UDC image. An input kernel 420 (e.g., $A_1$ of FIG. 2) may be determined by adjusting a size of the input kernel 410. In the example of FIG. 4, the input kernel 420 may be determined by cropping the input kernel 410. The input kernel 420 may have a smaller size than the input kernel 410.

By applying a kernel offset to the input kernel 420 based on an offset window 430 and an offset parameter, an output kernel 440 may be determined. The offset window 430 may be determined based on the size of the input kernel 420. The offset window 430 may have a size corresponding to the size of the input kernel 420. In the example of FIG. 4, offset values of the offset window 430 may be distributed in a Gaussian pattern, and kernel values at a central portion of the input kernel 420 may increase much larger than kernel values at an outer portion of the input kernel 420 (e.g., the kernel values may increase towards the central portion and the kernel values may decrease towards the outer portion). The offset values at the central portion of the offset window may have the largest value, and the offset values may gradually decrease toward the outer portion of the offset window.

Comparing the input kernel 420 and the output kernel 440 in the example of FIG. 4, the kernel values at the central portion of the input kernel 420 may increase much larger than the kernel values at the outer portion of the input kernel 420 according to the distribution of the offset values of the offset window 430. The output kernel 440 may exhibit more excellent contrast enhancement performance than the input kernels 410 and 420.

Figure 5:
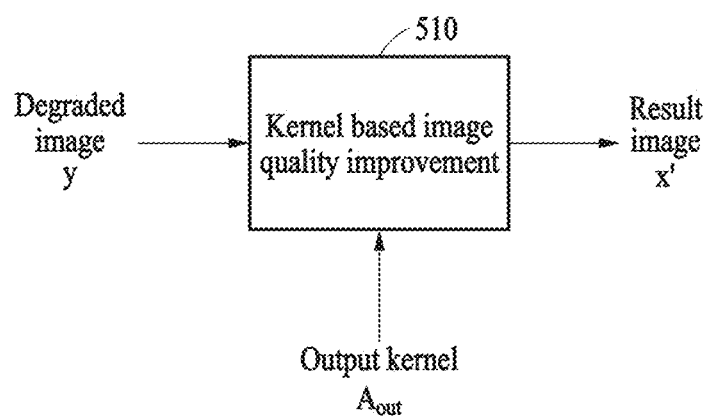
FIG. 5 illustrates an example of enhancing an image quality using an output kernel.

FIG. 5 illustrates an example of enhancing an image quality using an output kernel. Referring to FIG. 5, an image processing apparatus may output a result image by performing image quality improvement 510 based on a degraded image and an output kernel. The degraded image may be expressed as y, the output kernel may be expressed as $A_{out}$, and the result image may be expressed as x'. The image processing apparatus may improve the image quality through a method of using prior information and/or a method of learning a relationship between the degraded image and the result image. For example, the method of using prior information may include a direct filtering method using an output kernel and/or a repetitive method. The relationship learning method may include a method of generating training data pairs each including a sample degraded image and a sample result image using an output kernel and learning a relationship between the training data pairs through deep learning.

Figure 6:
FIG. 6 illustrates an example of an effect of a contrast adjustment parameter on a result image.

FIG. 6 illustrates an example of an effect of a contrast adjustment parameter on a result image. Referring to FIG. 6, a degraded image 610, a result image 620 according to an existing kernel, and result images 630 and 640 according to modified kernels are shown. For example, the degraded image 610 may be acquired through a UDC, and the existing kernel may be acquired or determined based on a captured pattern. Referring to the result image 620, the result image 620 determined by a typical image processing apparatus using the existing kernel (but not the modified kernels) may achieve sharpness enhancement and ghost removal of the degraded image 610, but may have limitations in haze removal and contrast enhancement. The image processing apparatus of one or more embodiments may modify the existing kernel through a kernel offset. Referring to the result images 630 and 640, the result images 630 and 640 determined by the image processing apparatus of one or more embodiments using the modified kernels, which may supplement the existing kernel, may achieve haze removal and contrast enhancement of the degraded image 610, in addition to sharpness enhancement and ghost removal. The result image 630 may be a result according to an offset with a weak intensity, and the result image 640 may be a result according to an offset with a strong intensity. The offset intensity may be adjusted according to the determined or predetermined purpose of image quality improvement or preference of a user or a developer.

Figure 7:
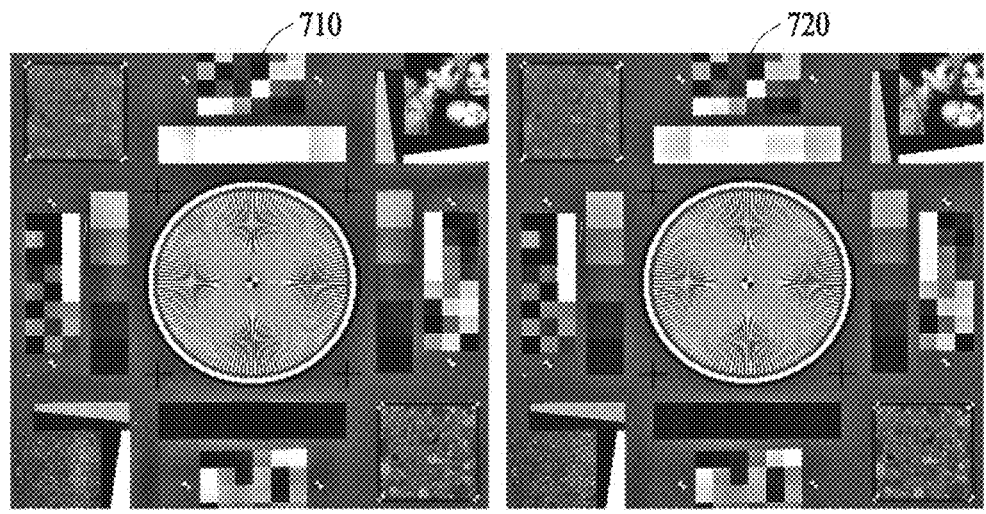
FIG. 7 illustrates an example of an effect of an offset window on a result image.

FIG. 7 illustrates an example of an effect of an offset window on a result image. Referring to FIG. 7, a result image 710 may be derived through an offset window without a pattern, and a result image 720 may be derived through an offset window with a predetermined pattern (e.g., a Gaussian distribution). Artifacts may be caused by strong contrast enhancement when a kernel offset is applied, and the offset window may mitigate such artifacts. Comparing the result image 710 and the result image 720, it may be learned that the result image 720 has fewer artifacts than the result image 710. Various offset patterns may be used according to the characteristics of degradation in a degraded image and/or a contrast adjustment direction according to the characteristics of the degradation.

Figure 8:
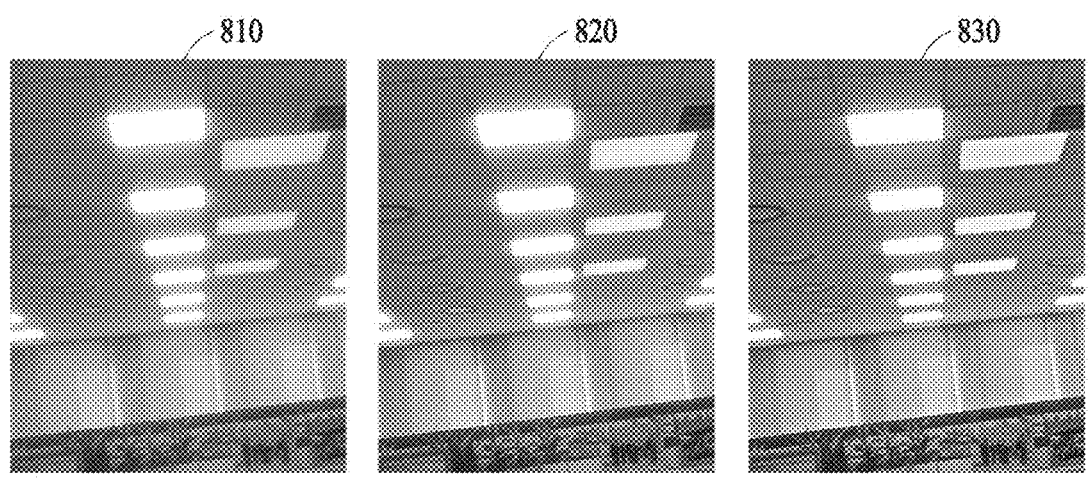
FIG. 8 illustrates an example of alleviating a glare by kernel modification.

FIG. 8 illustrates an example of alleviating a glare by kernel modification. Referring to FIG. 8, a degraded image 810, a result image 820 according to an existing kernel, and a result image 830 determined by the image processing apparatus of one or more embodiments according to a modified kernel are shown. For example, the degraded image 810 may be acquired through a UDC, and the existing kernel may be acquired based on a captured pattern. Since glare accompanies saturation, a different kernel may be used depending on an intensity of a light source causing the glare. Therefore, the image processing apparatus of one or more embodiments may process the glare through a separate method. Kernel modification by the image processing apparatus of one or more embodiments may be effective in glare mitigation. Referring to the result image 830, the modified kernel, even as a single kernel, may achieve contrast enhancement and further mitigate the glare.

Figure 9:
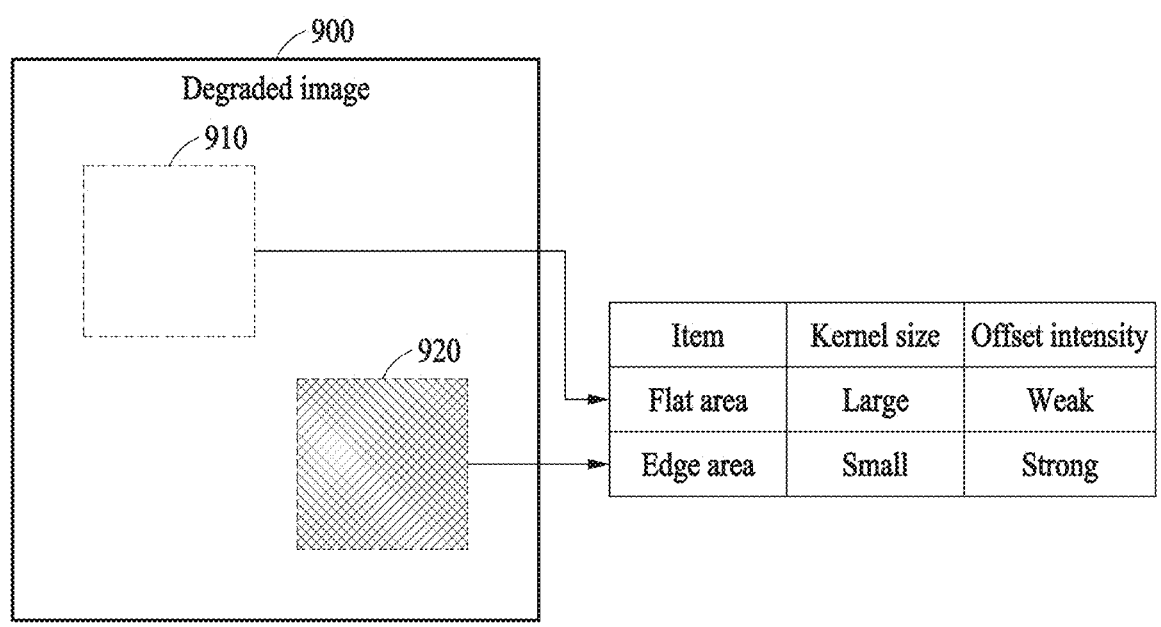
FIG. 9 illustrates an example of kernel settings adaptive to image characteristics.

FIG. 9 illustrates an example of kernel settings adaptive to image characteristics. Referring to FIG. 9, an image processing apparatus may detect a first area 910 and a second area 920 having different image characteristics in a degraded image 900. For example, the first area 910 may be a flat area, and the second area 920 may be an edge area. The flat area may be an area including few or no edges, and the edge area may mean an area including a lot of edges. The edge area may correspond to a texture area. The image processing apparatus may detect edges in the degraded image 900 using various edge detection techniques such as a Laplacian filter, and extract the areas 910 and 920 from the degraded image 900 based on the detected edges.

Since the flat area and the edge area have different image characteristics, different kernel offsets may be individually set. For example, for the respective areas, different window sizes and/or offset intensities may be applied. For example, a large kernel size and an offset with a weak intensity may be appropriate for the flat area, and a small kernel size and an offset with a strong intensity may be appropriate for the edge area. The image processing apparatus may set a window size of a first kernel offset for the first area 910 to be larger than a window size of a second kernel offset for the second area 920, and set an intensity of an offset parameter of the first kernel offset to be weaker than an intensity of an offset parameter of the second kernel offset. The value of a contrast adjustment parameter may be set to be large for a strong offset and to be small for a weak offset.

Figure 10:
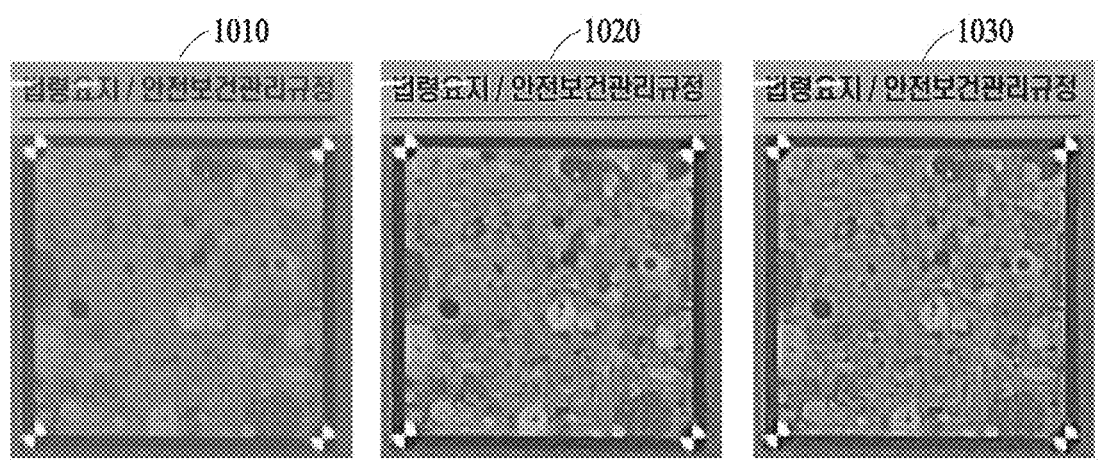
FIG. 10 illustrates an example of an effect of a difference in kernel settings.

FIG. 10 illustrates an example of an effect of a difference in kernel settings. Referring to FIG. 10, a degraded image 1010, a result image 1020 according to a uniform kernel, and a result image 1030 according to an adaptive kernel are shown. For example, the degraded image 1010 may be acquired through a UDC. Comparing the result images 1010 to 1030, it may be learned that the result image 1030 determined by the image processing apparatus of one or more embodiments achieves greater sharpness enhancement and artifact suppression in an edge area and greater noise mitigation in a flat area.

Figure 11:
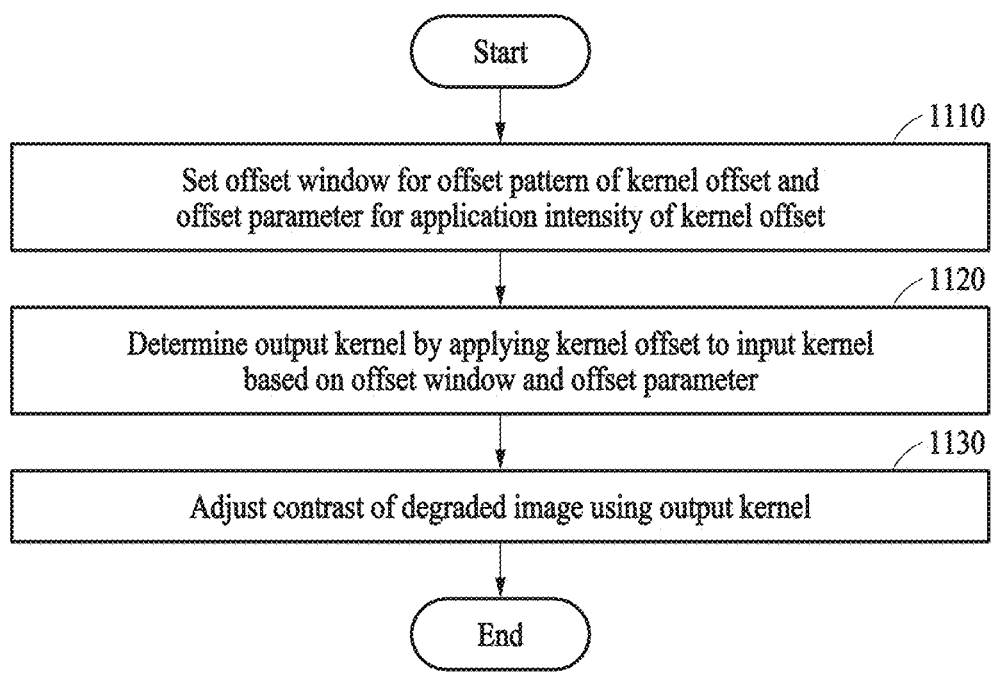
FIG. 11 is a flowchart illustrating an example of an image processing method.

FIG. 11 is a flowchart illustrating an example of an image processing method. Operations 1110 to 1130 of FIG. 11 may be performed sequentially or non-sequentially. For example, the order of operations 1110 to 1130 may be changed, and/or at least two of operations 1110 to 1130 may be performed in parallel.

Referring to FIG. 11, in operation 1110, an image processing apparatus may set an offset window for an offset pattern of a kernel offset and an offset parameter for an application intensity of the kernel offset. Operation 1110 may include setting a distribution type of offset values in the offset window, and setting a distribution parameter specifying a detailed distribution of the distribution type. The distribution type may include a Gaussian distribution, and the distribution parameter may include a standard deviation of the Gaussian distribution.

Operation 1110 may include setting a contrast adjustment parameter for a contrast adjustment degree, and setting the offset parameter by normalizing the contrast adjustment parameter based on the offset values of the offset window. The contrast adjustment parameter may be set based on image characteristics of a degraded image. A size of the offset window may correspond to a size of an input kernel, and an intensity of the contrast adjustment parameter may be adjusted to be appropriate for the size of the offset window according to normalization.

The image processing apparatus may adjust the size of the input kernel. In this case, operation 1110 may include setting a size of the offset window and the offset parameter based on the adjusted size of the input kernel.

The image processing apparatus may detect a first area and a second area having different image characteristics in the degraded image. In this case, operation 1110 may include individually setting the offset window and the offset parameter for each of the first area and the second area. The first area may correspond to a flat area, and the second area may correspond to an edge area. Operation 1110 may include setting a size of a first offset window for the first area to be larger than that of a second offset window for the second area, and setting an intensity of the first offset parameter for the first area to be weaker than that of the second offset parameter for the second area.

In operation 1120, the image processing apparatus may determine an output kernel by applying the kernel offset to the input kernel based on the offset window and the offset parameter. Operation 1120 may include determining a new input kernel by applying the kernel offset to the input kernel, and determining the output kernel by normalizing the new input kernel based on kernel values of the new input kernel.

In operation 1130, the image processing apparatus may adjust contrast of the degraded image using the output kernel.

In addition, the description provided with reference to FIGS. 1 to 10, 12 and 13 may apply to the image processing method.

Figure 12:
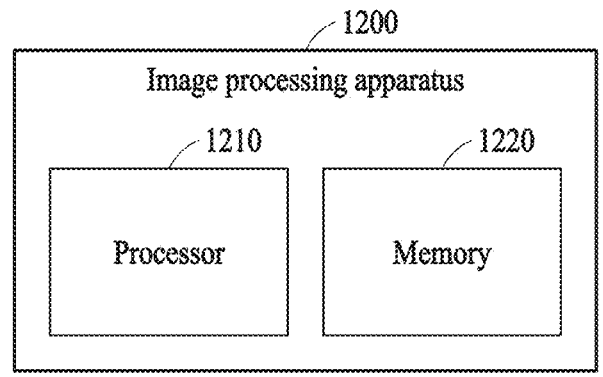
FIG. 12 is a block diagram illustrating an example of an image processing apparatus.

FIG. 12 is a block diagram illustrating an example of an image processing apparatus. Referring to FIG. 12, an image processing apparatus 1200 includes a processor 1210 (e.g., one or more processors) and a memory 1220 (e.g., one or more memories). The memory 1220 may be connected to the processor 1210 and may store instructions executable by the processor 1210, data to be operated by the processor 1210, or data processed by the processor 1210. The memory 1220 may include a non-transitory computer-readable medium (for example, a high-speed random access memory) and/or a non-volatile computer-readable medium (for example, at least one disk storage device, flash memory device, or another non-volatile solid-state memory device).

The processor 1210 may execute the instructions to perform any one or more or all of the operations and methods described above with reference to FIGS. 1 through 11 and described below with reference to FIG. 13. For example, the processor 1210 may set an offset window for an offset pattern of a kernel offset and an offset parameter for an application strength of the kernel offset, determine an output kernel by applying the kernel offset to an input kernel based on the offset window and the offset parameter, and adjust contrast of a degraded image using the output kernel.

In addition, the description provided with reference to FIGS. 1 through 11, and 13 may apply to the image processing apparatus 1200.

Figure 13:
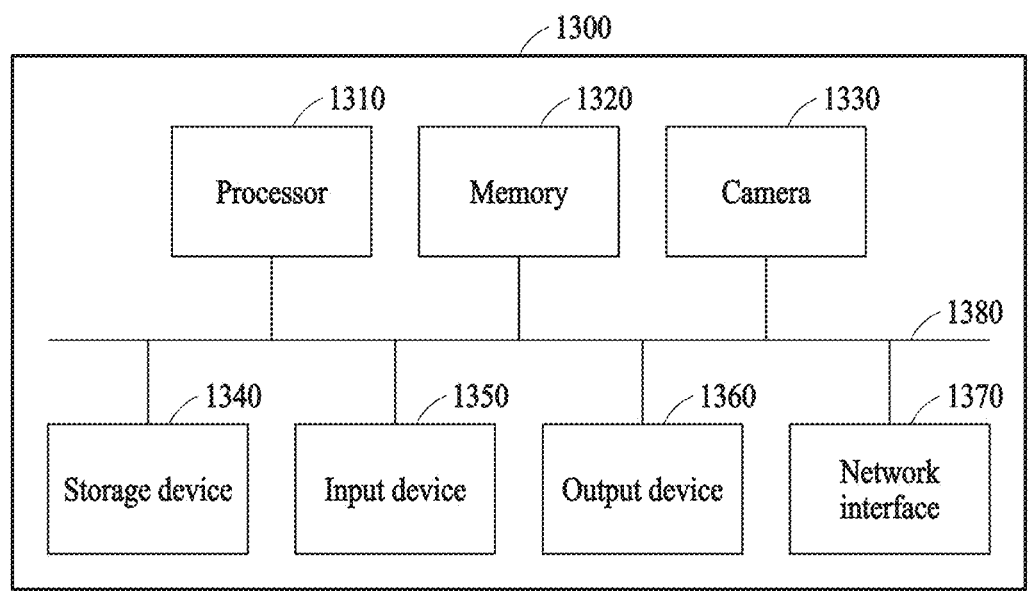
FIG. 13 is a block diagram illustrating an example of an electronic device.

FIG. 13 is a block diagram illustrating an example of an electronic device. Referring to FIG. 13, an electronic device 1300 may include a processor 1310 (e.g., one or more processors), a memory 1320 (e.g., one or more memories), a camera 1330, a storage device 1340, an input device 1350, an output device 1360, and a network interface 1370 that may communicate with each other through a communication bus 1380. For example, the electronic device 1300 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as an autonomous vehicle or a smart vehicle. The electronic device 1300 may structurally and/or functionally include the image processing apparatus 100 of FIG. 1 and/or the image processing apparatus 1200 of FIG. 12.

The processor 1310 executes functions and instructions for execution in the electronic device 1300. For example, the processor 1310 may process instructions stored in the memory 1320 or the storage device 1340. The processor 1310 may perform any one or more or all operations and methods described above with reference to FIGS. 1 through 12. The memory 1320 may include a computer-readable storage medium or a computer-readable storage device. The memory 1320 may store instructions to be executed by the processor 1310 and may store related information while software and/or an application is executed by the electronic device 1300.

The camera 1330 may capture a photo and/or a video (e.g., the degraded image 101). The storage device 1340 includes a computer-readable storage medium or computer-readable storage device. The storage device 1340 may store a more quantity of information than the memory 1320 for a long time. For example, the storage device 1340 may include a magnetic hard disk, an optical disc, a flash memory, a floppy disk, or other types of non-volatile memory known in the art.

The input device 1350 may receive an input from the user in traditional input manners through a keyboard and a mouse, and in new input manners such as a touch input, a voice input, and an image input. For example, the input device 1350 may include a keyboard, a mouse, a touch screen, a microphone, or any other device that detects the input from the user and transmits the detected input to the electronic device 1300. The output device 1360 may provide an output of the electronic device 1300 to the user through a visual, auditory, or haptic channel. The output device 1360 may include, for example, a display, a touch screen, a speaker, a vibration generator, or any other device that provides the output to the user. The network interface 1370 may communicate with an external device through a wired or wireless network.

The image processing apparatuses, processors, memories, cameras, storage devices, input devices, output devices, network interfaces, communication buses, image processing apparatus 100, image processing apparatus 1200, processor 1210, memory 1220, processor 1310, memory 1320, camera 1330, storage device 1340, input device 1350, output device 1360, network interface 1370, communication bus 1380, and other apparatuses, devices, units, modules, and components described herein with respect to FIGS. 1 through 13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An image processing method, comprising:
adjusting a size of an input kernel;
setting an offset window for an offset pattern of a kernel offset and an offset parameter for an application intensity of the kernel offset;
determining an output kernel by applying the kernel offset to the input kernel based on the offset window and the offset parameter; and
adjusting contrast of a degraded image using the output kernel,
wherein the setting of the offset window and the offset parameter comprises setting a size of the offset window and the offset parameter based on the adjusted size of the input kernel.

2. The method of claim 1, wherein the setting of the offset window and the offset parameter comprises:
setting a distribution type of offset values in the offset window; and
setting a distribution parameter specifying a detailed distribution of the distribution type.

3. The method of claim 2, wherein
the distribution type comprises a Gaussian distribution, and
the distribution parameter comprises a standard deviation of the Gaussian distribution.

4. The method of claim 1, wherein the setting of the offset window and the offset parameter comprises:
setting a contrast adjustment parameter for a contrast adjustment degree; and
setting the offset parameter by normalizing the contrast adjustment parameter based on the offset values of the offset window.

5. The method of claim 4, wherein the step of setting the contrast adjustment parameter comprises setting the contrast adjustment parameter based on an image characteristic of the degraded image.

6. The method of claim 4, wherein
a size of the offset window corresponds to a size of the input kernel, and
an intensity of the contrast adjustment parameter is adjusted based on the size of the offset window according to the normalizing.

7. The method of claim 1, further comprising:
detecting a first area and a second area having different image characteristics in the degraded image,
wherein the setting of the offset window and the offset parameter comprises individually setting the offset window and the offset parameter for each of the first area and the second area.

8. The method of claim 7, wherein
the first area and the second area respectively correspond to a flat area and an edge area, and
the setting of the offset window and the offset parameter comprises:
setting a size of a first offset window for the first area to be larger than that of a second offset window for the second area; and
setting an intensity of the first offset parameter for the first area to be weaker than that of the second offset parameter for the second area.

9. The method of claim 1, wherein the determining of the output kernel comprises:
determining a new input kernel by applying the kernel offset to the input kernel; and
determining the output kernel by normalizing the new input kernel based on kernel values of the new input kernel.

10. A non-transitory computer-readable storage medium storing instructions that, when executed by a processor, configure the processor to perform the method of claim 1.

11. An image processing apparatus, comprising:
a processor configured to:
adjust a size of an input kernel;
set an offset window for an offset pattern of a kernel offset and an offset parameter for an application intensity of the kernel offset,
determine an output kernel by applying the kernel offset to the input kernel based on the offset window and the offset parameter, and
adjust contrast of a degraded image using the output kernel,
wherein the setting of the offset window and the offset parameter comprises setting a size of the offset window and the offset parameter based on the adjusted size of the input kernel.

12. The apparatus of claim 11, wherein, for the setting of the offset window and the offset parameter, the processor is further configured to:

set a distribution type of offset values in the offset window, and set a distribution parameter specifying a detailed distribution of the distribution type.

13. The apparatus of claim 11, wherein, for the setting of the offset window and the offset parameter, the processor is further configured to:

set a contrast adjustment parameter for a contrast adjustment degree, and set the offset parameter by normalizing the contrast adjustment parameter based on the offset values of the offset window.

14. The apparatus of claim 11, wherein the processor is further configured to:

detect a first area and a second area having different image characteristics in the degraded image, and for the setting of the offset window and the offset parameter, individually set the offset window and the offset parameter for each of the first area and the second area.

15. The apparatus of claim 14, wherein the first area and the second area respectively correspond to a flat area and an edge area, and for the setting of the offset window and the offset parameter, the processor is further configured to:

set a size of a first offset window for the first area to be larger than that of a second offset window for the second area, and set an intensity of the first offset parameter for the first area to be weaker than that of the second offset parameter for the second area.

16. The apparatus of claim 11, wherein, for the determining of the output kernel, the processor is further configured to:

determine a new input kernel by applying the kernel offset to the input kernel, and determine the output kernel by normalizing the new input kernel based on kernel values of the new input kernel.

17. The apparatus of claim 11, further comprising a memory storing instructions that, when executed by the processor, configure the processor to perform the setting of the offset window and the offset parameter, the determining of the output kernel, and the adjusting of the contrast.

18. An electronic device comprising:

a processor configured to:

set a distribution type of offset values in an offset window, and a distribution parameter specifying a detailed distribution of the distribution type, set the offset window based on the distribution type and the distribution parameter, set a contrast adjustment parameter for a contrast adjustment degree, set an offset parameter by normalizing the contrast adjustment parameter based on the offset values of the offset window, determine an output kernel by applying a kernel offset to an input kernel based on the offset window and the offset parameter, and adjust contrast of a degraded image using the output kernel.

19. The electronic device of claim 18, wherein the processor is further configured to:

determine a new input kernel by applying the kernel offset to the input kernel, and determine the output kernel by normalizing the new input kernel based on kernel values of the new input kernel.

20. An electronic device comprising:

one or more sensors configured to obtain an input image; and one or more processors configured to:

determine a kernel offset based on a distribution parameter and a contrast adjustment parameter;

determine an output kernel by applying the kernel offset to an input kernel; and determine an output image by applying the output kernel to the input image, wherein the determining of the output kernel comprises:

determining a new input kernel by applying the kernel offset to the input kernel; and determining the output kernel by normalizing the new input kernel based on kernel values of the new input kernel.

21. The electronic device of claim 20, wherein, for the determining of the kernel offset, the one or more processors are configured to:

determine an offset window based on the distribution parameter;

determine an offset parameter based on the contrast adjustment parameter; and determine the kernel offset based on the offset window and the offset parameter.

22. The electronic device of claim 21, wherein kernel values of the offset window increase towards a central portion of the offset window and decrease towards an outer portion of the offset window.

23. The electronic device of claim 20, wherein the one or more sensors comprise an under-display camera (UDC), and for the obtaining of the input image, the UDC is configured to obtain a degraded image.

* * * * *